Feb. 6, 1934.                W. C. RAGALS                 1,945,866
                WEASAND AND METHOD FOR PREPARING THE SAME
                          Filed June 4, 1932
Fig. 1.
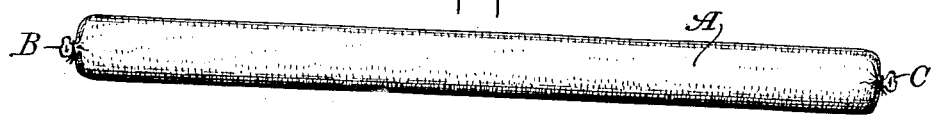
Fig. 2.
Fig. 3.
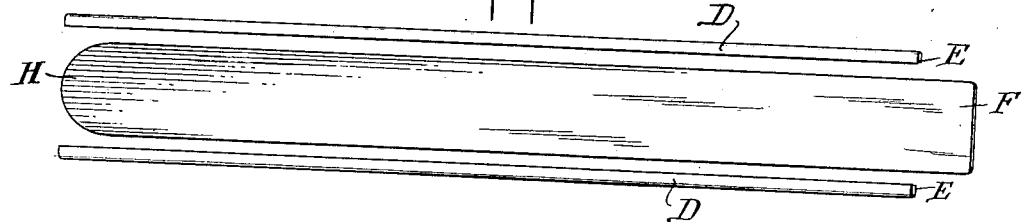
Fig. 4.
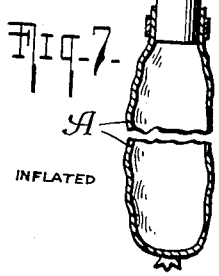
Fig. 7.
INFLATED
Fig. 5.
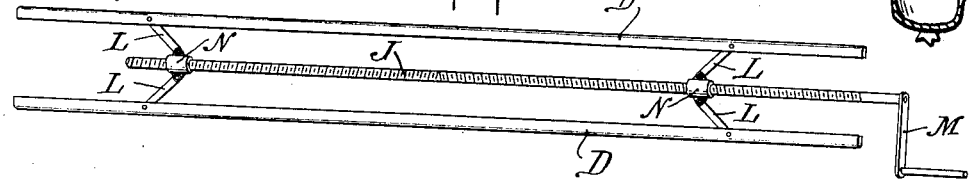
Fig. 8.
DETACHED FROM
AIR PRESSURE
AFTER INFLATION
Fig. 6.
WITNESS
G. V. Rasmussen
INVENTOR
WILLIAM C. RAGALS
BY
Biesen Schrenk
ATTORNEYS Patented Feb. 6, 1934

1,945,866

UNITED STATES PATENT OFFICE 1,945,866

WEASAND AND METHOD FOR PREPARING THE SAME

William C. Ragals, Buenos Aires, Argentina, assignor to Berth. Levi & Co., Inc., New York, N. Y., a corporation of New York Application June 4, 1932, Serial No. 615,330, and in Argentina March 18, 1932

4 Claims. (Cl. 17—45)

The invention relates to animal casings used for sausages or the like, particularly those which are prepared from the weasands of cattle. The object of the invention is to so treat the weasands as to widen and straighten them, whereby their capacity is enlarged and a uniformity of shape of the final sausage product is secured.

The invention is based upon the discovery that casings prepared from cattle weasands in contradistinction to those made of the intestines possess the property of retaining a stretched size and shape. According to the present invention, this observation is given practical effect by the introduction of stretching instrumentalities into the interior of the weasands and thereby causing them to become enlarged and at the same time to be provided with straight sides, all weasands of the same original size being widened to approximately the same stretched dimensions. The result of this proceeding is that the user of the casings will not only be provided with weasand casings of a larger capacity than those otherwise obtainable, but by reason of the uniformity in size of the casings when completed as sausages will find them easier to pack for shipment and more economical to ship since a greater quantity of straight sausages can be packed in a given packing case than irregularly shaped sausages. In being able to obtain straight weasands instead of weasands in their natural twisted shape, the straight shape is maintained in the manufactured sausage. The ability of obtaining a straight sausage is important from the point of view of appearance and use, since all cross-sectional cuts will have the same dimensions.

Heretofore it has been customary, after the weasands had been cleaned of meat, at which time they are about an inch wide, to close one end and to blow them up with air, to tie up the other end, then hang them in a drying room for a period of approximately eight to ten hours. Since a weasand is not of homogeneous strength throughout its extent, the pressure air contained therein concentrates on the weaker spots and when in blowing up the casings it is observed that the admission of further pressure air is not expedient, the introduction of additional pressure air is discontinued. This procedure limits the size of the individual casings and gives them an irregular shape due to the effect of the pressure air on different parts of the casing.

Weasands, when prepared according to the new method, can be stretched to a greater capacity than was possible in the previous procedure. Thus, a weasand prepared by the previous methods might have a width of 7 cm., whereas the same weasand when prepared by the new method, will have a width of 9 cm. The resultant greater capacity permits six or seven weasands to suffice the sausage manufacturer, where heretofore he had been compelled to use ten—an economy of approximately 30%.

In practicing the present invention, the fresh weasand, after being cleaned of meat, has one end tied up and is then blown up with air or otherwise tested to determine the approximate size which the casing would have if it were prepared in accordance with the old method. The air is then released and stretching instrumentalities having straight stretching edges are introduced into the interior of the weasand and the weasand is then put under stretching strain appropriate to enlarge that particular natural size of weasand to the predetermined dimension for that size which, generally speaking, is in the neighborhood of 25% or 30% larger than the size of the air-distended weasands. After the weasands are thus mechanically stretched, they are hung up in a drying room for approximately eight to ten hours, the stretched condition being maintained during the drying period. When the stretched weasands are fully dry the stretching instrumentalities are removed from the interior of the weasands. Subsequently, after sorting casings of the same general size, they are steamed and flattened and packaged in bundles of quantities convenient to the trade, such as twenty-four or twenty-five. The casings of each bundle, being of substantially uniform size, can be conveniently and economically packed for shipment, and when received by the sausage manufacturer, can be most conveniently handled and used by him. The method of dealing with weasands thus far described changes the character of the weasands. The two opposite flat sides of the casing will have the characteristics of a stretched material, maintained under stretching stress during the change from a wet condition to a thoroughly dried condition. The opposite straight edges of the casing on the other hand will possess the characteristics of a casing which, in being stretched and remaining under stretching strain, lies upon and in contact with a surface over which the stretching occurs. The difference in the two parts of the improved weasand is perhaps comparable to the differences which exist in the membrane of a drum as between those parts which are struck by the drum sticks and the edge portions by means of which the membrane is maintained in its tightly stretched condition.

The improved weasand and apparatus suitable for the production of the same are illustrated in the accompanying drawing in which Fig. 1 represents a sausage in the manufacture of which the improved weasand was used; Fig. 2 illustrates the improved weasand as supplied to the sausage manufacturer; Fig. 3 illustrates one form of stretching instrumentalities; Fig. 4 shows how the stretching instrumentalities of Fig. 3 are employed in connection with the weasand in the process of its preparation; Fig. 5 is a section on line 5—5 of Fig. 4; Fig. 6 illustrates an alternative form of stretching instrumentality; Fig. 7 illustrates on a small scale a raw weasand pneumatically stretched by inflation with air preliminary to the subsequent mechanical stretching of instrumentalities such as are shown in Figs. 3 to 6; and Fig. 8 illustrates on the same reduced scale as is used in connection with Fig. 7 the deflated raw weasand after pneumatic stretching and before the mechanical stretching operation.

In the drawing A represents the improved weasand which is shown in Fig. 1 as the outside retaining membrane of a sausage; B represents the closed end of the weasand which is closed in a manner well understood in this art, from the very beginning, that is, at the time when the fresh wet weasands are first begun to be prepared for use as sausage casings. C represents a similarly closed end which, however, is closed at the very end of the sausage-manufacturing process after the sausage meat has been fully introduced into its casing.

When the natural weasand with its end B closed is to be expanded or stretched in accordance with this invention, it is first inflated with air in the customary manner hereinabove described and thereupon, after deflation devices such as illustrated in Figs. 3, 4, and 5 (or Fig. 6) may be conveniently employed. The mechanical devices of Fig. 3 consist of two rails D, grooved at E for the reception of the slider-spreader F. The rails D are slightly longer than the weasand so that they may extend from the closed end B of the weasand out beyond the open end of the weasand as indicated at G in Fig. 4. The spreader F at the end which approaches the closed end of the weasand is preferably rounded, as indicated at H. In the use of these instrumentalities the two rails D are first inserted into the weasand and the end H of the spreader F inserted in the grooves E of the rails. The round end H of the spreader will force the rails apart as the spreader is advanced into the weasand while the grooves E will assure continuance of relative position of the several parts. When the spreader F is fully introduced into the weasand the position of Fig. 4 will be arrived at from which it will be seen that notwithstanding the rounded forward edge H of the spreader the rails will serve to preserve complete parallelism throughout the entire extent of the weasand from one end to the other. The rails D are preferably greased or lubricated not only at the grooved portions to ease the forcible insertion of the spreader F but on the outer surfaces to facilitate separation and removal of the rails from the dried weasand after the spreader F has been withdrawn.

Instead of the instrumentalities shown in Fig. 3, an instrumentality capable of performing the same operations such as shown in Fig. 6, may be used. In that case loosely pivoted links L are connected with each of the rails D and also with an internally screw-threaded nut N, one of said sets of links being situated near each of the two ends of the rails D. A screw-threaded rod J, the threads of which engage the threads of the nuts N, occupies a central position between the rails D, the degree of stretch as between the rails D and the extent of collapse, for removing the appliance of Fig. 6 from the stretched casing is controlled by movement of the crank M. In Fig. 6 the links L at the right and left-hand portions of the figure are shown as extending from the rails toward the centrally vertical median line of Fig. 6. In that case the threads on the rod J and of the co-operating nuts will extend in opposite directions, as indicated in the drawing, so as to insure a constant relation of parallelism as between the rails D, irrespective of the extent to which they may be spread or collapsed.

From Fig. 5 it will be observed that that part of the weasand which is designated as A' is under unsupported stretching strain between the edges of the opposed rails D, while at that portion of the weasand marked $A^2$ it is in contact during the stretching period with the surface of the rails. The difference of the conditions prevailing in the several parts of the weasand during its stretched condition is visible in the final weasand as is indicated in Fig. 2, so that the finished product cannot only be identified and distinguished from all prior forms of weasands by the parallelism of its edges but also by the tautened and substantially creaseless sides and somewhat thicker creaseless and stretched edge portions. The treatment to which the weasands are subjected by the use of the described process results in imparting to the finished product a stronger texture than that possessed by weasands prepared by prior processes.

I claim:

1. The method of preparing weasands which consists in subjecting the raw weasands to pneumatic stretching to approximately their natural limits and then to such mechanical stretching of the whole texture transversely of the weasands in opposite and parallel directions under exclusion of shrinking agents whereby a tautened unsupported condition will be set up throughout the whole of the sides of the weasand and a supported tension condition in the edge portions of the weasand, drying the stretched weasand, and maintaining said mechanical stretching stresses until the drying is completed.

2. The method of preparing weasands which consists in subjecting the raw weasands to pneumatic stretching to approximately their natural limits, deflating, and then bringing opposite inner portions thereof into contact with elements having rigid parallel surfaces, mechanically spreading said surfaces against the resistance of the weasands under exclusion of shrinking agents until the weasands are materially enlarged over their normal size as defined in the pneumatic stretching step, drying the thus tensioned weasands and during the drying period maintaining the said stretched condition, then relaxing the stretching forces and removing the rigid elements from the weasands.

3. An improved flat, parallel-edged, seamless weasand having flat tautened creaseless sides and somewhat thicker creaseless stretched edge portions all free from artificially shrunken portions, the structure and texture of the side and edge portions respectively being such as results from an initial pneumatic stretching of the weasand to approximately its natural limit followed by more intense mechanical stretching in transverse directions, the side walls of the weasand being out of texture-affecting contact with the stretching instrumentalities during the period of the more intense mechanical stretching while during said period the edge portions remain in contact with such instrumentalities.

4. The method of preparing weasands which consists in subjecting the raw weasands to pneumatic stretching to approximately their natural limits and then to mechanical stretching of the whole texture transversely of the weasands, drying the stretched weasands and maintaining the mechanical stretching stress until the drying is completed.

WILLIAM C. RAGALS.